April 6, 1926. 1,579,353
R. GOOD
WATER COOLED BRIDGE
Filed Nov. 1, 1924　　2 Sheets-Sheet 1

Inventor
Robert Good
By Eccleston & Eccleston
Attorneys

April 6, 1926.
R. GOOD
WATER COOLED BRIDGE
Filed Nov. 1, 1924
1,579,353
2 Sheets-Sheet 2
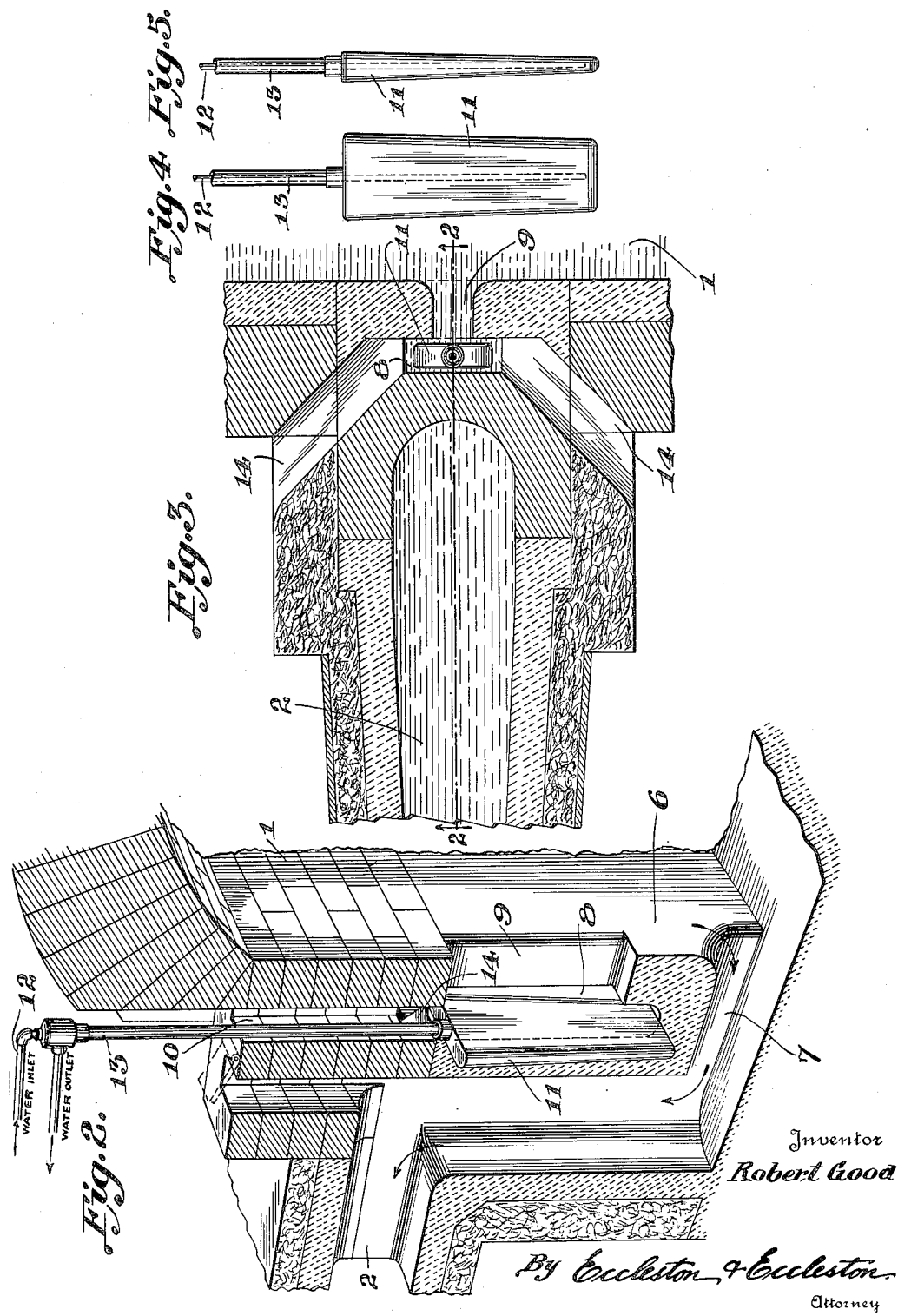

Patented Apr. 6, 1926.

1,579,353

UNITED STATES PATENT OFFICE.

ROBERT GOOD, OF WASHINGTON, PENNSYLVANIA.

WATER-COOLED BRIDGE.

Application filed November 1, 1924. Serial No. 747,360.

*To all whom it may concern:*

Be it known that I, ROBERT GOOD, a citizen of the United States, residing at Washington, in the county of Washington and State of Pennsylvania, have invented certain new and useful Improvements in Water-Cooled Bridges, of which the following is a full, clear, and exact description.

In the modern glass tank a division wall or bridge is located between the melting compartment and the refining end of the tank. As the glass in the melting compartment becomes perfectly fused it becomes more dense and sinks to the lower strata, while the imperfectly fused material remains floating on the top until melted. Hence the conventional bridge of the modern tanks is provided with holes or passages at the bottom thereof to permit the perfectly fused glass to pass from the melting compartment into the refining end of the tank. From the surface of the refining end the glass is either drawn off by means of flow spouts or the like, or is taken out by hand gathering irons, all of which is old and well-known in the art.

In the conventional tanks of the character described, the bridge is entirely surrounded by molten glass and is subjected to the attacks of the melting fluxes in the tank, and unless protected is soon destroyed. It is a common practice to provide these bridges with water cooling means and the life of the bridges is considerably extended by the use of such protective means. At best, however, the life of the conventional bridge is not more than 8 or 10 months and when the bridge has been destroyed it becomes necessary to shut down the entire tank for a period of something like three weeks while the bridge is being repaired.

Bridgeless tanks have been known for many years, but in conjunction with them it has been necessary to employ the well-known bootleg or flow block. In such structures the bootleg or flow block is exposed to the attacks of the melting fluxes in the tank and unless protected is soon destroyed. But it will be understood, of course, that where the individual bootleg or flow block is employed it is only necessary to shut down that particular unit when the bootleg has been destroyed, and the other units of the tank may continue operation as usual.

It would therefore seem clear that the ideal construction would consist of a bridgeless tank equipped with a separate refining means for each unit on the tank and said refining means being practically indestructible; and the object of the present invention is to provide such a construction.

For a full disclosure of my invention reference is to be had to the accompanying drawing in which, Figure 1 is a vertical sectional view of a portion of a glass tank and one of its flow spout units;

Figure 2 is a perspective vertical sectional view taken on line 2—2 of Figure 3, and clearly showing the construction of the bridge and water cooler;

Figure 3 is a horizontal sectional view taken on line 3—3 of Figure 1;

Figure 4 is a detail front view of the water cooler; and,

Figure 5 is a detail side view of the water cooler.

Figure 1:
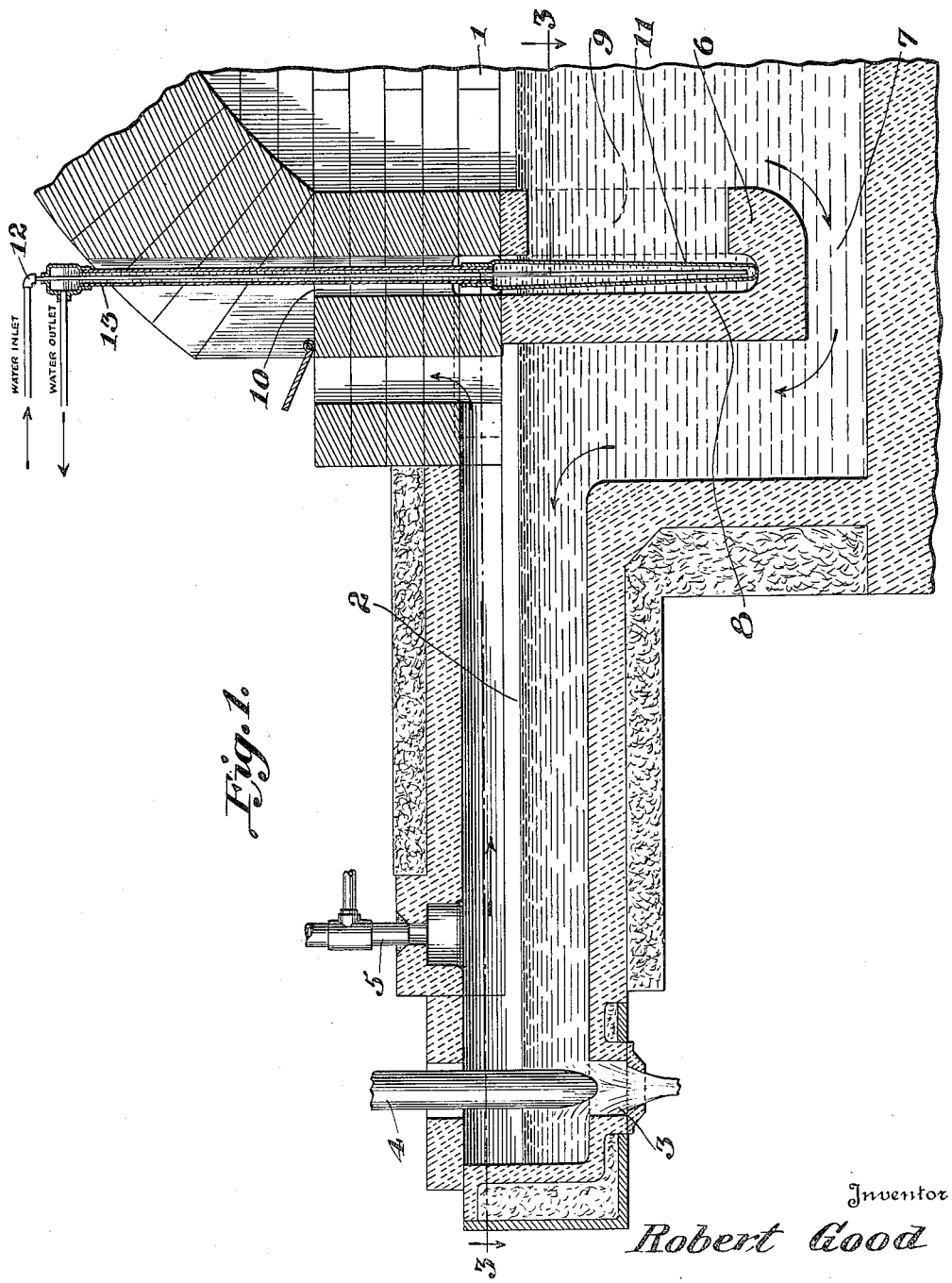

Referring to the drawings more in detail, numeral 1 indicates a portion of a glass tank with the conventional bridge or division wall omitted. Numeral 2 refers generally to an ordinary flow spout which may be of any desired construction. Each tank is provided with a plurality of flow spouts, as is the usual practice. The end of the flow spout is provided with the usual flow orifice 3 and an adjustable or reciprocating plug 4. The particular means for discharging the glass from the flow spout and for controlling the discharge thereof forms no part of the present invention, and it will be understood that any desired means may be employed; and as will appear hereinafter, the invention is also equally well adaptable for hand gathering. The usual burner 5 is provided adjacent the end of the flow spout.

All of the foregoing construction is old and well-known in the art and is merely shown and generally described herein for the purpose of giving a more clear understanding of the invention.

In place of the conventional bridge between the melting compartment and the refining end of the tank I substitute an individual bridge located between the tank and each of the flow spouts. The bridge is referred to in the drawings by numeral 6, and the lower end of the bridge is provided with a passage 7 to permit the flow of glass from the tank to the flow spout. I make this individual bridge of the best flux clay, but it will be understood that the invention is in no manner limited to the particular material used for the purpose.

The bridge is provided with a pocket 8 and this pocket communicates with the interior of the tank by means of a slot 9. As will appear hereinafter, the function of the slot is to allow a free flow of glass from the tank into the pocket and vice versa, so that the pocket will be filled with glass when the cooler is removed, and so that the cooler will largely displace the glass from the pocket into the tank when the cooler is introduced. The width of the slot is preferably from 2 to 3 inches. In my present installation it is 3 inches. The more narrow the slot is the better protection the pocket affords to the cooler, but if it is made too narrow it will be difficult to force the cooler down into place.

The pocket in the individual bridge has vertically aligned therewith a similar pocket or passage 10 provided in the tank wall. The passage 10 permits the insertion and removal of the cooler. The cooler is indicated by numeral 11 and it is preferably a hollow metallic member with both its end walls and side walls tapering from top to bottom thereof as clearly indicated in Figures 4 and 5. The tapering construction is for the purpose of permitting the ready withdrawal of the cooler when desired. The supply of cold water is introduced into the cooler by means of a water inlet pipe 12 which reaches nearly to the bottom of the cooler, as indicated in Figures 1 and 4. The water passes out from the cooler through an outlet pipe 13 which also functions as a handle for introducing and removing the cooler.

It is obvious that the passage 10 above the pocket 8 would ordinarily become highly heated by conductivity through the comparatively thin wall between the passage and the interior of the tank. To prevent this passage above the glass from becoming highly heated, I provide two lateral passages 14 which communicate with the atmosphere and with the interior of the passage 10 just above the surface of the glass as clearly shown in Figure 3. By this construction it is obvious that the passage 10 acts as a chimney and a constant current of air is drawn in through the two air entrance passages, which current of air contributes largely to the cooling of the passage 10 thereby reducing the heating effect on the outflowing water through the pipe 13, and consequently also reducing the heating effect on the incoming water through the pipe 12. By reference to Figure 1 it will be seen that the top of the slot 9 is located a little below the surface of the glass, thereby preventing the escape of the gasses of the furnace into the interior of the pocket 8 and passage 10. The bottom of the slot is usually just a few inches above the lower end of the cooler when the latter is in place in the pocket.

The operation of the apparatus will no doubt be clearly understood from the foregoing description, but it may be briefly described as follows:

Assume that the cooler 11 is removed and that the tank and flow spout are filled with glass to the usual lever as indicated in Figure 1. If no means were used for cooling the bridge 6 it would be rapidly destroyed and would be entirely impracticable. As hereinbefore stated, water cooling means for bridges are notoriously old, but prior to the present invention no water cooling means for a bridge has been devised which will keep the temperature of the bridge sufficiently low to render it practically indestructible. This is accomplished, however, in the novel construction disclosed herein. The pocket 8 and the slot 9 will be filled with molten glass and as the cooler 11 is lowered into position a portion of the molten glass in the pocket will be displaced by the cooler. When the cooler is about to be lowered a current of cold water is passed therethrough by means of the inlet and outlet pipes 12 and 13 respectively, and then when the cooler is lowered into position the molten glass surrounding the cooler quickly becomes chilled and encases it in a hard wall of glass. It is thus seen that there is only a very slight space between the walls of the pocket and the cooler, and that this space is filled with chilled glass which acts as a conductor to carry off the heat from the bridge to the cooler. The cooler thus has heat conducting contact with the bridge at all points thereof, and it will thus function in a most efficient manner by keeping the temperature of the bridge at a minimum. The invention is not necessarily limited to the space in the pocket being filled with chilled glass, for it would be possible to pack the space in the pocket around the cooler with some heat conducting material, and the present invention contemplates such use but it is believed at the present time that the packing of chilled glass presents the most practical construction. The peculiar construction of the bridge with the pocket and slot therein together with the arrangement of the cooler in the pocket presents what is believed to be an entirely new construction in bridges, and one which will maintain the temperature of the bridge low enough to render the same practically indestructible.

As hereinbefore stated, both the side walls and the end walls are tapered from top to bottom, and by this construction the cooler may be easily removed through the passage 10 whenever desired.

Another very material feature of this invention resides in the position of the bridge wall; that is, instead of locating my improved bridge between the melting compartment and refining end, I employ an individual bridge for each flow spout; each individual bridge being mounted between the flow spout and the tank. While that is obviously the preferred construction, it is to be clearly understood that the invention is not limited to that construction, for instead of using the individual bridges as I am now doing I may employ the conventional bridge between the melting compartment and the refining end of the tank, and provide that conventional bridge with my improved cooling means. In other words, the present invention contemplates providing the conventional bridge with a pocket 8, a slot 9, and a water cooler 11.

Hand gathering is not used to any extent at the present time, but the present invention is well adapted to such use. To use the apparatus for hand gathering it would only be necessary to provide a suitable opening in the cover through which the gatherer could introduce a gathering iron, and to supply means for keeping the surface of the glass at the required temperature.

I have not made any mention herein of the specific materials that will be used in the various parts of the construction, or have I made mention of the specific material which will be used for heat insulating purposes; it being understood that in all cases that material will be used which is best adapted for the particular purpose.

It is believed that the foregoing description will render the invention entirely clear to those skilled in the art to which it appertains, and it will be obvious that the invention is subject to numerous changes and modifications, all such I aim to include in the following claims.

What I claim as new is:

1. A glass furnace including a melting tank and flow spouts, an individual bridge for each flow spout, and individual cooling means for each bridge.

2. A glass furnace including a melting tank and flow spouts, an individual bridge for each flow spout, and individual cooling means for each bridge, said cooling means adapted to be easily inserted and removed.

3. A glass furnace including a bridge, said bridge having a pocket therein, a cooler adapted to be mounted in said pocket, and means of communication between the melting tank and said pocket.

4. A glass furnace including a bridge spaced from the floor thereof and permitting the flow of glass to the feeder, said bridge having a pocket therein, and said bridge also having a slot permitting the flow of glass into the pocket from the melting tank.

5. A glass furnace including a bridge, said bridge having a pocket therein, said bridge also having a slot permitting communication between the pocket and the melting tank, and a cooler adapted to be inserted in said pocket.

6. A glass furnace including a bridge, said bridge having a pocket therein, and a cooler adapted to be inserted in the pocket, the pocket being slightly larger than the cooler and arranged to receive glass.

7. A glass furnace including a bridge, said bridge having a pocket therein, and a cooler adapted to be inserted in the pocket, the pocket being slightly larger than the cooler, the arrangement being such that heat conducting material may be positioned in the space surrounding the cooler.

8. A glass furnace including a bridge, said bridge having a pocket therein, a cooler adapted to be inserted in said pocket, the pocket being slightly larger than the cooler, and said pocket having communication with the melting tank whereby glass may flow into the pocket.

9. A glass furnace including a melting tank and flow spouts, an individual bridge for each flow spout, each of said bridges having a pocket therein, each of said bridges also having means of communication between the said pockets and the melting tank, and a cooler adapted to be inserted in each of the pockets.

10. A glass furnace including a melting tank and flow spouts, an individual bridge for each flow spout, each of said bridges having a pocket therein, and a cooler adapted to be inserted in each pocket, the pockets being slightly larger than the coolers, the arrangement being such that heat conducting material may be positioned in the space surrounding the coolers.

11. A glass furnace including a melting tank and flow spouts, an individual bridge for each flow spout, a cooler adapted to be inserted in each pocket, the pockets being slightly larger than the coolers, and said pockets having communication with the melting tank whereby glass may flow into the pockets.

12. A glass furnace including an individual bridge, said bridge having a pocket therein, a cooler adapted to be inserted in the pocket, the walls of the cooler tapering from the top toward the bottom.

13. A glass furnace including an individual bridge, said bridge having a pocket therein extending downwardly to within a very short distance of the bottom of the bridge, and a cooler adapted to be inserted in said pocket and be surrounded with glass.

14. A glass furnace including an individual bridge, said bridge having a pocket therein, said furnace having a passage aligned with the pocket, and a cooler adapted to be inserted in said pocket through said passage.

15. A glass furnace including an individual bridge, said bridge having a pocket therein, cooling means adapted to be inserted in the pocket, said furnace having a vertical passage aligned with the pocket and a lateral passage communicating with the atmosphere and the vertical passage, for the purpose described.

16. A glass furnace including an individual bridge, said bridge having a pocket therein, cooling means adapted to be inserted in the pocket, said furnace having a vertical passage aligned with the pocket and lateral passages communicating with the atmosphere and with the bottom of the vertical passage, for the purpose described.

17. A glass furnace including an individual bridge, said bridge having a pocket therein, said bridge also having a slot permitting communication between the pocket and the melting tank, said furnace having a passage aligned with the pocket, and a cooler adapted to be inserted in said pocket through said passage.

18. A glass furnace including an individual bridge, said bridge having a pocket therein, said bridge also having a slot permitting glass to flow from the melting tank into the pocket, the top of said slot terminating just below the normal level of the glass in the melting tank, and a cooler adapted to be inserted in the pocket.

19. A glass furnace including an individual bridge, said bridge having a pocket therein, and said bridge also having means to permit the flow of glass from the melting tank to the pocket and vice versa, a cooler adapted to be inserted in said pocket, said cooler comprising a hollow metallic member and water inlet and outlet pipes connected with said hollow member.

20. A glass furnace including an individual bridge, said bridge having a pocket therein, and said bridge also having means to permit the flow of glass from the melting tank to the pocket and vice versa, a cooler adapted to be inserted in said pocket, said cooler comprising a hollow metallic member and water inlet and outlet pipes associated with said hollow member, the water inlet pipe extending to a point adjacent the bottom of the hollow member.

ROBERT GOOD.